United States Patent [19]
Han et al.

[11] Patent Number: 5,751,934
[45] Date of Patent: May 12, 1998

[54] NON-BLOCKING FAULT-TOLERANT GAMMA NETWORK FOR MULTI-PROCESSOR SYSTEM

[75] Inventors: Jong-Seok Han; Woo-Jong Hahn; Suk-Han Yoon, all of Daejeon, Rep. of Korea

[73] Assignee: Electronics and Telecommunications Research Institute, Daejeon, Rep. of Korea

[21] Appl. No.: 747,685

[22] Filed: Nov. 12, 1996

[30] Foreign Application Priority Data

Dec. 8, 1995 [KR] Rep. of Korea .................. 95-47847

[51] Int. Cl.$^6$ ........................... G06F 13/00; H04Q 11/04
[52] U.S. Cl. ............... 345/182.02; 370/388; 340/825.8
[58] Field of Search ..................... 395/182.02, 200.15; 340/824.02, 826; 370/60.1, 94.3, 16, 288, 386, 357, 351, 422

[56] References Cited

U.S. PATENT DOCUMENTS

| | | | |
|---|---|---|---|
| 4,751,514 | 6/1988 | Sheriff | 343/717 |
| 4,962,497 | 10/1990 | Ferenc et al. | 370/60.1 |
| 5,175,733 | 12/1992 | Nugent | 370/94.3 |
| 5,179,551 | 1/1993 | Turner | 370/228 |
| 5,181,017 | 1/1993 | Frey, Jr. et al. | 340/825.02 |
| 5,218,676 | 6/1993 | Ben-Ayed et al. | 395/200.15 |
| 5,253,248 | 10/1993 | Dravida et al. | 370/16 |
| 5,471,623 | 11/1995 | Napolitano et al. | 395/200.03 |

FOREIGN PATENT DOCUMENTS 0505782 9/1992 European Pat. Off. .

OTHER PUBLICATIONS

A Survey and Comparison of Fault–Tolerant Multistage Interconnection Networks; George B. Adams III, Dharma P. Agrawal and Howard Jay Siegel; pp. 14–27; Jun. 1987.
A Survey of Interconnection Networks; Tse–yun Feng; pp. 5–20; Dec. 1981.
Abstract of U.S. Patent Serial No: 07/660,503 filed Feb. 26, 1991.

*Primary Examiner*—Robert W. Beausoliel, Jr.
*Assistant Examiner*—Ly V. Hua
*Attorney, Agent, or Firm*—Antonelli, Terry, Stout, & Krauss, LLP

[57] ABSTRACT

A non-blocking fault tolerant gamma network for a multi-processor system is disclosed, including: N dual links respectively connected to n source nodes, and for transmitting data input; a first stage made up with n 2×3 switching devices for outputting data transmitted from the N dual links; a second stage made up with n 3×4 switching devices for outputting data output from the first stage; a third stage to n–1 stage made up with (n–2)×N 4×4 switching devices for receiving data output from the second stage at the third stage and outputting the data to n–1 stage; an n stage made up with n 4×2 circuits for receiving data output from the n–1 stage and outputting the data; and n dual links connected to n destination nodes for transmitting data output from the n stage, whereby the links, which connect the n source nodes, switching devices of the interconnection network and n destination nodes, are designed according to the connection formula of the certain regulation, thus simultaneously set all paths between a plurality of sources and a plurality of destinations, and tolerate a single-switching fault or a single-link fault in the interconnection network.

3 Claims, 4 Drawing Sheets

NON-BLOCKING FAULT-TOLERANT GAMMA NETWORK FOR MULTI-PROCESSOR SYSTEM

BACKGROUND OF THE INVENTION

The present invention relates to an interconnection network of a parallel computer, and more particularly, to a non-blocking fault-tolerant gamma network for a tightly coupled multi-processor system with a shared memory.

A multi-processor system includes a plurality of processing nodes and an interconnection network.

The interconnection network of the multi-processor system is an important structural element determining the structure and performance of the multi-processor system, and therefore the interconnection network of the invention has non-blocking and single fault-tolerance characteristics, thereby providing high performance and reliability.

In the conventional art, a multi-processor system has a unique architectural characteristic suitable for each application area. Furthermore, the most important factor defining the architectural characteristic is the connection architecture, namely, the interconnection network for connecting the processor in the system.

The interconnection network is classified into a bus network, a multistage interconnection network and a crossbar network.

While the bus network can be easily implemented low cost, the system has decreased performance in a large scale system due to its limitation regarding a bus bandwidth.

The crossbar network, in general, has a good connection and thus guarantees high efficiency. But its designing costs increase by $O(n^2)$ according to the number of the processing node, and therefore is not suitable for a large-scale system. Many multi-stage interconnection networks are introduced as the interconnection network having low costs and high performance by complementing the disadvantages of the bus network and the crossbar network. Therefore, "A Survey of Interconnection Networks" by T. Y. Feng, is introduced on IEEE Computers, December 1981, pp.12.27.

The performance of the multi-processor system depends upon a combination capability of the interconnection network, namely, upon the capability to simultaneously set a plurality of sources and a plurality of destinations.

The crossbar network provides a perfect combinational capability of simultaneously setting all paths between the plurality of sources and the plurality of destinations. This kind of interconnection network is called a non-blocking interconnection network.

However, the designing costs of the crossbar network increase in accordance with $O(n^2)$ in structuring a large-scale system.

The multistage interconnection network has many switches between the source and the destination, and thus sets a path in the switching device of the interconnection network. The multistage interconnection network, originally, is a blocking interconnection network which does not simultaneously set all paths.

Therefore, there has been much research directed overcome the blocking characteristic of the multi-stage interconnection network, and thus provide good combinational capabilities at low costs.

To solve the blocking problem by providing an extra path by using an 8×8 crossbar switch, "A multi-function network" is invented by Howard T. Olnowich (Howard T. Olnowich, et al., "Multi-function network" European Patent Application, No. 92103761.0, May 3, 1992).

The multi-function network is a multi-stage interconnection network which provides an extra path and rearrangeability, and thus has non-blocking characteristics. Therefore, performance of the multi-function network is lower and less efficient than the pure non-blocking multistage interconnection network. Here, the rearrangeability denotes the capability to guarantee the non-blocking characteristic by re-trying the path-setting until the suitable non-blocking path is set, using an extra path. This kind of multi-stage interconnection network provides many combinational paths which cannot be designed in the blocking interconnection network. However, because the path setting operation should be continually retried until the path of the suitable non-blocking is set, the technique also has an additional timing load for setting the path. U.S. Pat. No. 5,179,551, filed on Jan. 12, 1993 entitled "Non-blocking multi-cast switching system" by Jonathan S. Turner, which is a multi-stage interconnection network having characteristics such rearrangeability and low cost, is suggested to reduce an additional timing load by rearranging the path for a short time, and also to reduce the cost of each network by including a small number of switching devices. However, the above-mentioned invention also has the problem of additional timing load due to the rearrangeability characteristics, and is inefficient compared to a pure non-blocking interconnection network.

In the research on the phase of the interconnection network in order to provide a good combinational capability with low costs by solving the blocking characteristic of the multi-stage interconnection network, another important factor to determine a phase of the multi-stage interconnection network is single fault tolerance.

Single fault tolerance indicates if the data transmission path exists between the source and the destination to continually perform its function as the interconnection network, when a single fault occurs in a switching device or link which forms the interconnection network.

As the fault occurring in the interconnection network may ultimately decrease the performance of the system, the single fault tolerance of the interconnection network becomes very important.

Until now, the research on the phase of the multi-stage interconnection network having the fault tolerant function has been actively advanced. For example, there was introduced a paper entitled "A survey and Comparison of Fault Tolerant Multistage Interconnection Networks", by G. B. Adams III, et. al., IEEE Computers, on June 1987, pp 14.27.

Also, for a single stage lambda network tolerating a single fault, there has been introduced U.S. Pat. No. 5,660,503, filed on May 1, 1993, entitled "Packet-switched intercommunication network for distributed memory, parallel processor computers," by L. M. Napolitano.

The single stage interconnection network implements its network with a single switching stage and repeats the single stage to set its path. In this respect, the single stage interconnection network is different from the multi-stage interconnection network.

The single stage lambda interconnection network provides a single fault tolerant capability, not the multi-stage interconnection network, and also cannot provide the non-blocking feature.

As a part of that technique, U.S. Pat. No. 5,321,813, filed on Jun. 14, 1994, entitled "Reconfigurable, Fault, Tolerant, Multistage Interconnect Network and Protocol," by R. J.

McMillan was introduced to tolerate a single fault. When a single fault does occur, the network can tolerate a single fault via an additional stage provided from the network. However, the network has also a problem that all paths cannot be simultaneously set, because the network is a blocking network.

SUMMARY OF THE INVENTION

An object of the invention is to solve the conventional problems described above, and to provide a multi-stage interconnection network which solves the blocking characteristic of the conventional multi-stage interconnection network, thereby providing a perfect combinational capability capable of simultaneously setting all paths between a plurality of sources and a plurality of destinations, and also provide a multi-stage interconnection network which can be designed at lower costs than the conventional non-blocking crossbar network in case of designing a large scale system.

Another object of the invention is to provide a single fault tolerant interconnection network having good reliability capable of tolerating a single switching fault or a single link fault in the network.

To achieve the object, the invention includes: N dual links respectively connected to N source nodes, and for transmitting data input; a first stage having N 2×3 switching devices for outputting data transmitted from the N dual links; a second stage having N 3×4 switching devices for outputting data output from the first stage; a third stage to n−1 stage having (n−2)×N 4×4 switching devices for receiving data output from the second stage at the third stage and outputting the data to n−1 stage; an n stage having N 4×2 switching devices for receiving data output from the n−1 stage and outputting the data; and N dual links connected to N destination nodes for transmitting data output from the n stage, whereby the links, which connect the N source nodes, switching devices of the interconnection network and N destination nodes, are designed according to the connection formula of the following regulation 1, thus simultaneously set all paths between a plurality of sources and a plurality of destinations, and tolerate a single-switching fault or a single-link fault in the interconnection network.

<REGULATION 1>

| | |
|---|---|
| $L(k)_{i,j}, L(k)_{i,j-2}{}^k L(k)_{i,i+2}{}^k$ | if $k = 0$, |
| $L(k)_{i,j}, L(k)_{i,j-2}{}^k L(k)_{i,i+2}{}^k, L(k)_{i,i+2}{}^{k+1}$ | if $1 \leq k < n - 1$ |
| $L(k)_{i,j}, L(k)_{i,j-2}{}^k L(k)_{i,i+2}{}^k, L(k)_{i,adj\,(i)}$ | if $k = n - 1$, |
| $L(k)_{i,j}, L(k)_{i,adj\,(i)}$ | if $k = n$ |

(Here, $n = \log_2(N)$, $0 \leq i \leq n - 1$,
N: the number of input ports or output ports of the interconnection network,
k: stage number of switches,
L: link,
adj (i) = adjacent switch or node of i).

The non-blocking fault tolerant gamma network achieving the object has N input ports and N output ports, provides a dual link to a source node connected to each input port and a destination node connected to each output port to tolerate a single link fault between each input/output ports and nodes. And even though a single switching fault does occur in the interconnection network, the invention guarantees an extra path between the source node and the destination node through the interconnection network to tolerate the single fault in the interconnection network.

The non-blocking fault tolerant gamma network includes: 2×3 switching devices having two input ports and three output ports; 3×4 switching devices having three input ports and four output ports; 4×4 switching devices having four input ports and four output ports; and 4×2 switching device having four input ports and two output ports. The interconnection network is structured as a certain connection regulation, that is, between the source node and the switching device, between the switching device and another switching device, and between the switching device and the destination node, so that the network solve the blocking characteristic of the conventional multi-stage interconnection network and thereby provides perfect combinational capability for simultaneously setting all paths between a plurality of sources and a plurality of destinations.

Further, the non-blocking fault tolerant gamma network of the invention divides its switching device into an even switching device which respectively transmits data to a central link, central-higher link or central-lower link when each routing tag is "0", and also transmits data to a higher link, or lower link when each routing tag is "1"; and an odd switching device which respectively transmits data to a central link, central-higher link or central-lower link when each routing tag is "1", and also transmits data to a higher link, or lower link when each routing tag is "0", in order to realize the self-routing scheme where the interconnection network sets a path for itself from the source node to the destination node with only the address of the destination node, avoiding a single fault and an inter-collision in the interconnection network.

BRIEF DESCRIPTION OF THE ATTACHED DRAWINGS

FIG. 1 schematically illustrates a multi-processor system connected between n processors and N shared memories according to one embodiment of the invention;

FIG. 2 schematically illustrates a multi-processor system connected between n processors and N shared memories according to another embodiment of the invention;

FIG. 3 schematically illustrates a unidirectional multi-stage interconnection network;

FIG. 4 illustrates the kinds of switch element for structuring an interconnection network; and FIG. 5 illustrates a construction of 8×8 non-blocking fault tolerance gamma network.

DETAILED DESCRIPTION OF PREFERRED EMBODIMENT

With reference to the attached drawings, preferred embodiments of the invention will be described below.

Figure 1:
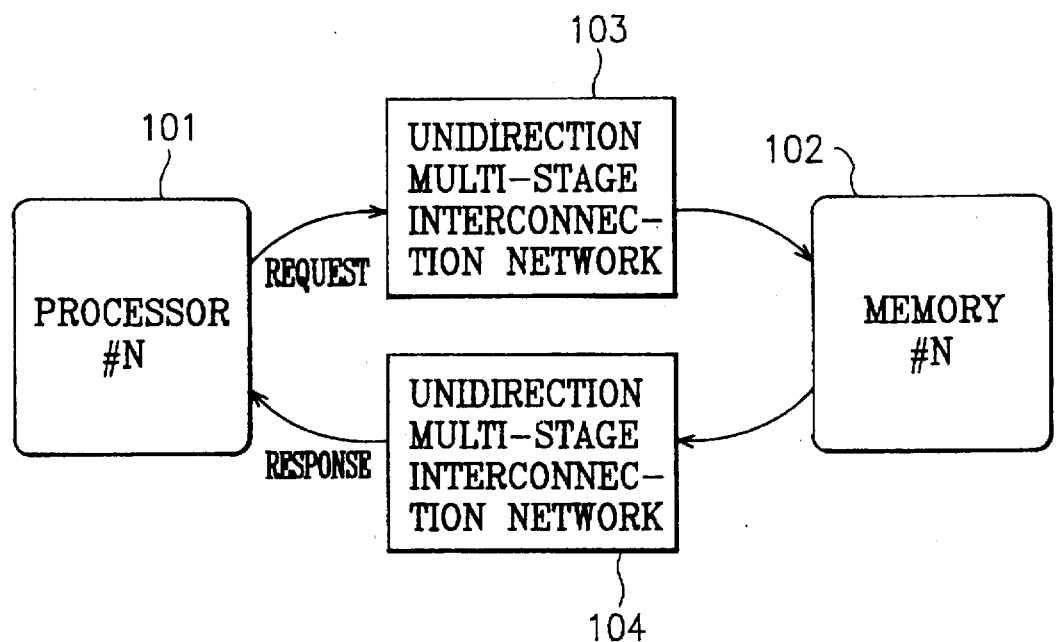
Figure 2:
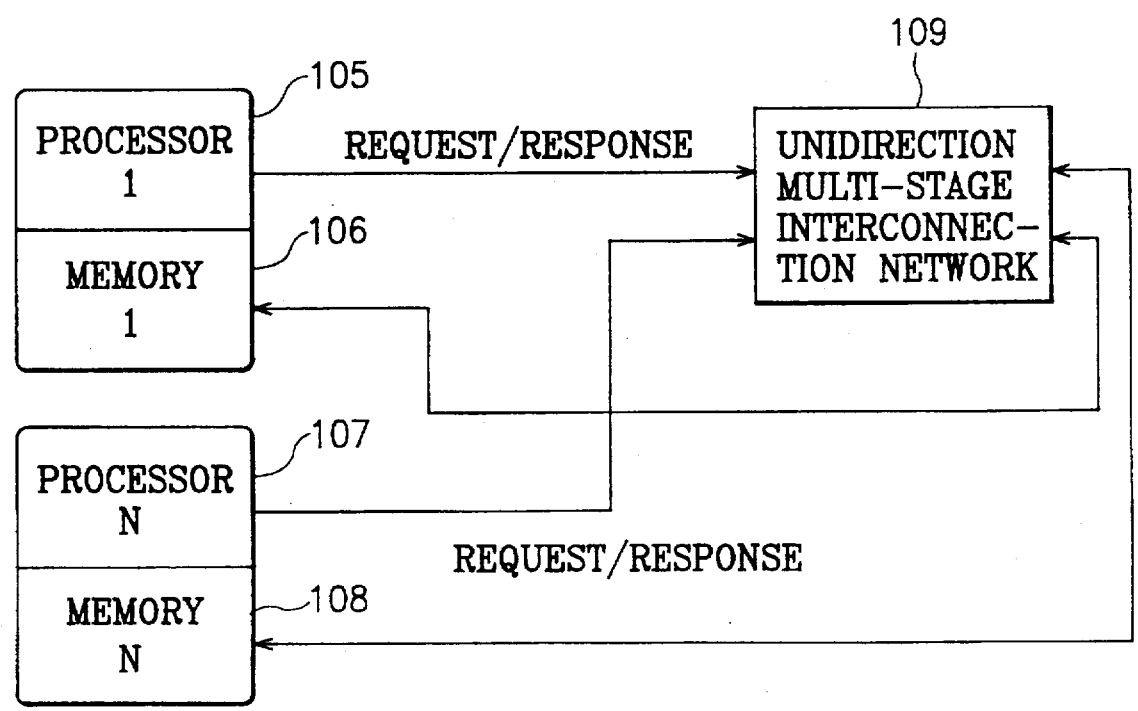

The present invention relates to a multistage interconnection network that provides a high performance and high reliability based on its non-blocking characteristic and single fault tolerant capability. FIGS. 1 and 2 are schematic views of the multi-processor system including a plurality of processing nodes and a plurality of shared memories.

The multi-processor system is divided into two types according to its structuring method.

FIG. 1 illustrates a construction in which N divided processing nodes and N shared memories are connected to a unidirectional multi-stage interconnection network. A plurality of processing nodes 101 make requests to a plurality of shared memories 102 through a first unidirectional multi-stage interconnection network 103, and the data provided in the plurality of shared memories 102 are transmitted to the plurality of processing nodes through a second unidirectional multi-stage interconnection network 104. In the above architecture, the processing nodes and the shared memories respectively have a pair of a data transmission part (not shown) and a data receiving part (not shown).

FIG. 2 illustrates an architecture in which N processing nodes and N shared memories are tightly connected so that N processor/shared memory nodes are connected to a unidirectional multi-stage interconnection network.

In the processor/shared memory nodes 105, 106, the processor 105 transmits data to a plurality of other processors/shared memory nodes (107,108) through a third unidirectional multi-stage interconnection network 109. The shared memory 108 of the other processor/shared memory nodes 107,108 transmits the required data through the above third unidirectional multi-stage interconnection network 109. Here, the processor/shared memory nodes have a pair of a data transmission part and a data receiving part, and the processor and shared memory in the node sharedly have the data transmission part and data receiving part.

In FIGS. 1 and 2, the interconnection networks 103, 104, 109 connect the processing node and the shared memory or the processor/shared memory nodes. The networks perform the same functions, so that each network has N input ports and N output ports. The network is a unidirectional interconnection network which transmits data from the input port to the output port.

The node connected to the input port of the interconnection network is called a source or a source node. The node or the memory which is connected to the output port of the interconnection network is called a destination or a destination node.

Figure 3:
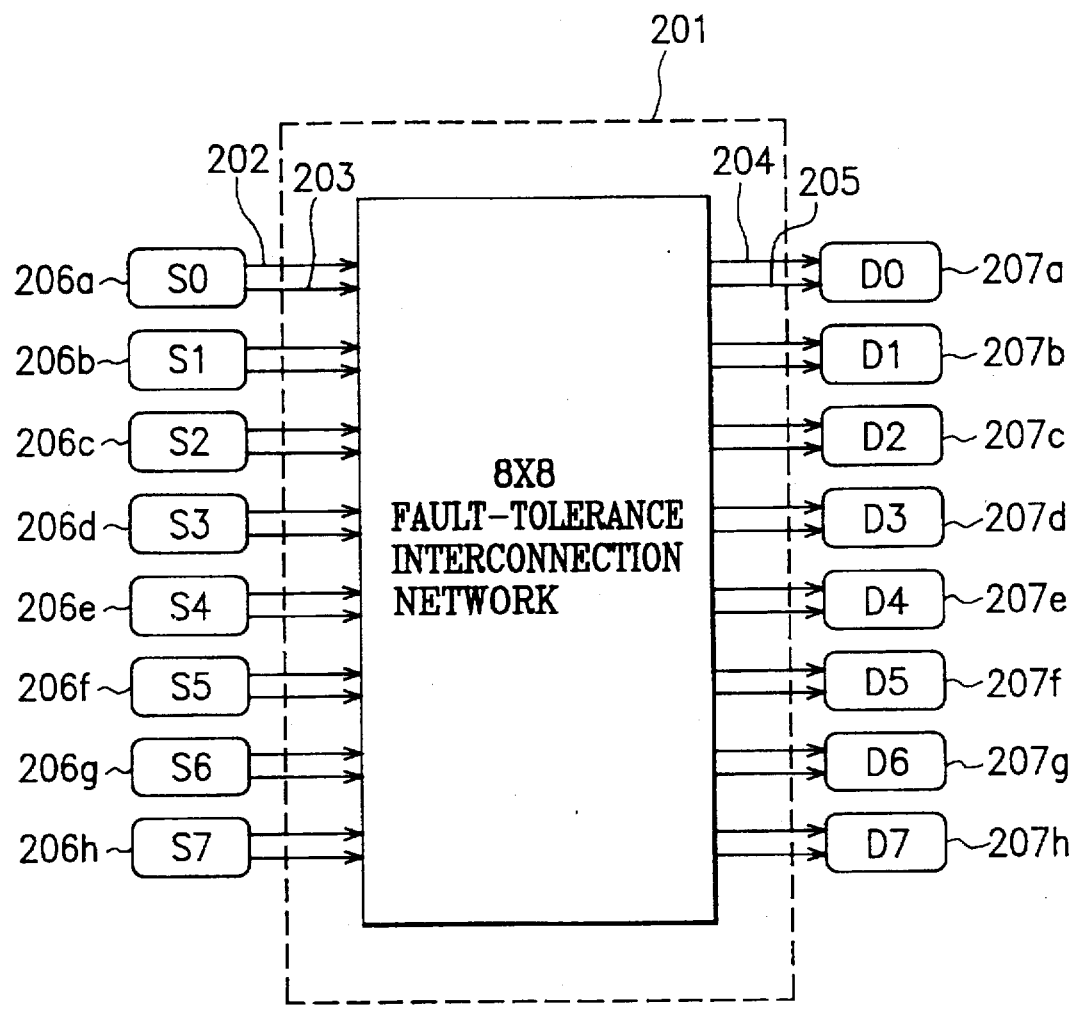

FIG. 3 is a schematic view of a unidirectional multi-stage interconnection network. The multi-stage interconnection network provides eight input ports and eight output ports, and also provides a dual link to the source node connected to the input port or the destination node connected to the output port, thereby tolerating the single fault.

The multi-stage interconnection network 201 provides a line for connecting the eight source nodes (S0 to S7) 206a to 206h and the eight destination nodes (D0 to D7) 207a to 207h. The link is a dual link for tolerating a single link fault which may occur in the input port link or the output port link.

Here, the single link fault of the input port or output port decreases the performance of the system by dividing the source node or destination node from the network, and therefore it is essential to provide a dual link for tolerating the single fault.

Even though the fault occurs in one of the dual links 202 and 203 connected to the source node 206a, the data can be transmitted through another link, and even though through the fault occurs in one of the dual links 204 and 205 connected to the destination node 207a, the data can be transmitted another link.

Similarly, a dual line is connected to another source nodes 206b to 206h and destination nodes 207b to 207h.

Figure 4:
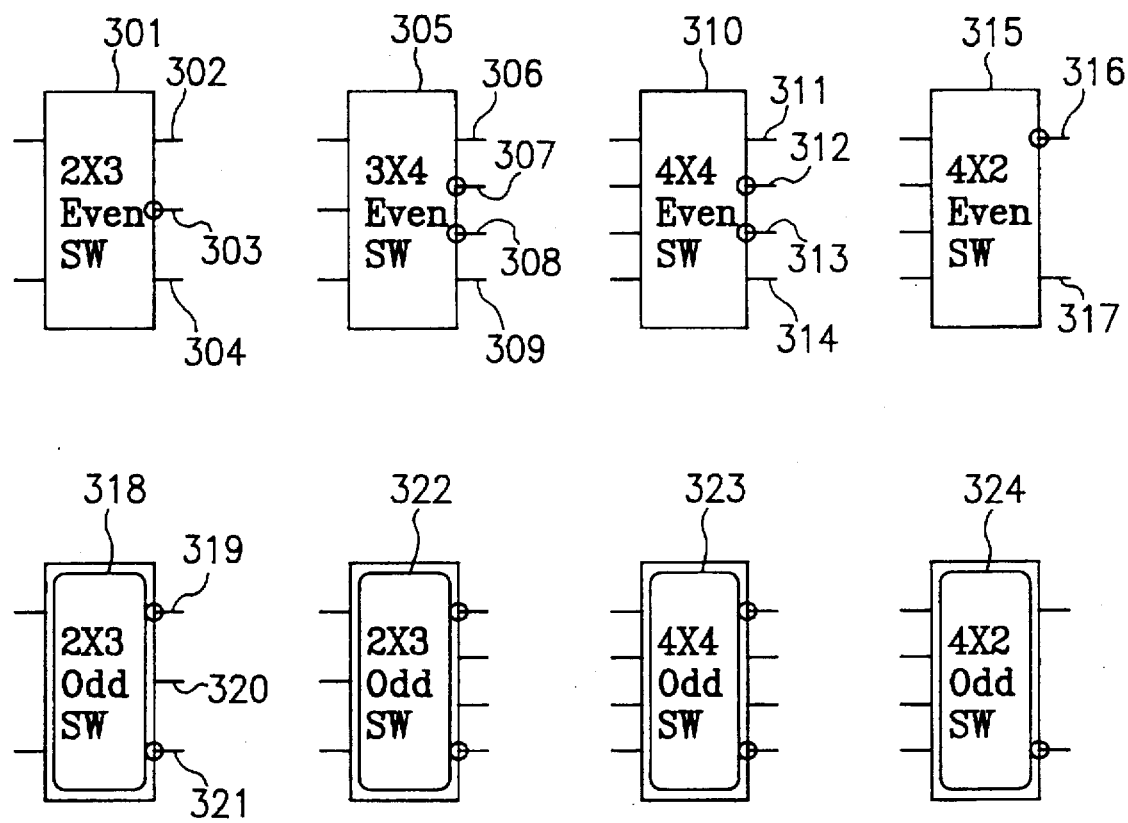

FIG. 4 shows switching elements which are required to form the non-blocking fault tolerant gamma network of the invention.

The switching element is classified into four kinds of circuits: 2×3 switching devices 301 and 318 each having two input ports and three output ports; 3×4 switching devices 305 and 322 each having three input ports and four output ports; 4×4 switching devices 310 and 323 each having four input ports and four output ports; and 4×2 switching devices 315 and 324 each having four input ports and two output ports.

In its routing scheme, a self-routing scheme is performed in a manner such that the interconnection network sets a path to the destination node with only an address of the destination node, avoiding the single fault and inter-collision in the interconnection network for itself, and therefore provides better routing scheme flexibility compared to another routing scheme.

The interconnection network of the invention uses the self-routing scheme.

The routing scheme from the source node to the destination node is performed in the switching device according to a routing algorithm of the network.

Two types of switching devices such as an even switch and an odd switch are used for the self-routing scheme. First, the 2×3 even switching device 301 has three output ports. When the routing tag is "0", the data is transmitted to a central link 303. When the routing tag is "1", the data is transmitted to either the higher link 302 or the lower link 304. Here, the data can always be transmitted using one of the higher or lower link which is not in use, and also guarantees the path to the same destination node.

The 2×3 odd switching device 318 has three output ports. When the routing tag is "0", the data is transmitted to either the higher link 319 or the lower link 321. When the routing tag is "1", the data is transmitted to a central link 320. That is, the odd switching device transmits data to the output ports opposite to the even switching device.

The 3×4 even switching device 305 and the 4×4 even switching device 310 each have four output ports. When the routing tag is "0", the data is transmitted to the central higher links 307 and 312 or the central lower links 308 and 313. When the routing tag is "138 , the data is transmitted to the higher links 306 and 311, or the lower links 309 and 314.

The 4×2 even switching device 315 has two output ports. When the routing tag is "0", the data is transmitted to the link 316 connected to the destination node. When the routing tag is "1", the data is transmitted to the link 317 connected to the adjacent node.

The 3×4 odd switching device 322, 4×4 odd switching device 323 and 4×2 odd switching device 324 output the data to the output ports opposite to the above-mentioned even switching devices 305, 310 and 315.

Figure 5:
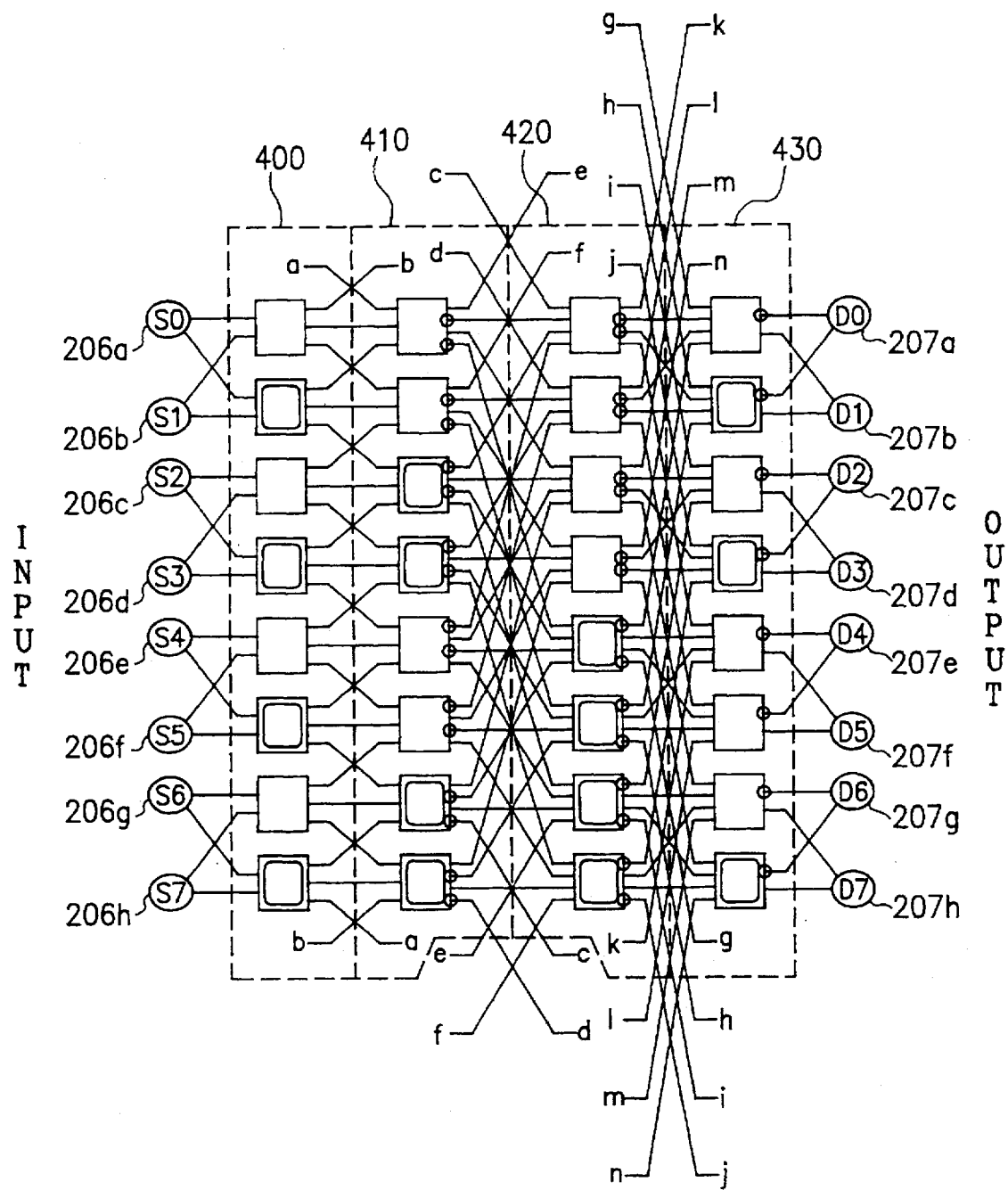

FIG. 5 illustrates a connection scheme of the non-blocking fault tolerant gamma network.

FIG. 5 is a 8×8 interconnection network 201 having eight input ports and eight output ports according to one embodiment of the invention.

The network includes N dual links connected to N source nodes, N dual links connected to N destination nodes, N 2×3 switching devices forming the first stage (stage 0) 400, N 3×4 switching devices forming the second stage (stage 1) 410, (n−2)×N 4×4 switching devices form the third (stage 2) to n−1 stage 420, and N 4×2 switching devices forming a last stage (stage n) 430. Here, N is the number of the input port or output port of the network, where $n=\log_2(N)$.

One of the dual links is connected to the source node, and the other is connected to the source-adjacent node. Here, the adjacent node is a node, the LSB of which is different among the addresses of the nodes. That is, if the source node "0"206a is marked as "S0", the S0 is a binary bit, so marked as "S0=$S_{n-1}$ ... $S_1S_0$=000". Likewise, the source node "1" 206b is marked as "S1=$S_{n-1}$ ... $S_1S_0$=001". Here, the source node "0" 206a and the source node "1" 206b are the adjacent nodes. In the 8×8 interconnection network, node 0 and 1, nodes 2 and 3, 3, node 4, node 5, node 6 and node 7 are respectively adjacent nodes. Additionally, one of the dual links is connected to one destination node, and the other is connected to the destination adjacent node.

Of the switching devices forming the first stage 400, when the switching device is marked as "ST(0)$_i$", the link connected from the ith switching device of the first stage 400 to the jth switching device of the second stage 410 is marked as "L(0)$_{ij}$", the three links of "ST(0)$_i$" are respectively connected to "ST(1)$_i$", "ST(1)$_{i-1}$" and "ST(1)$_{i+1}$" of the second stage 410, and marked as "L(0)$_{ii}$", "L(0)$_{i,i-1}$" and "L(0)$_{i,i+1}$".

In the same manner as the above description, of the switching devices forming the second stage 410, when the ith switching device is marked as "ST(1)$_i$", the link connected from the ith switching device of the second stage 410 to the jth switching device of the third stage 420 is marked as "L(1)$_{ij}$", the four links of "ST(1)$_i$" are respectively connected to "ST(2)$_i$", "ST(2)$_{i-2}$", "ST(2)$_{i+2}$ and ST(2)$_{i+4}$" of the third stage 420, and marked as "L(1)$_{ii}$", "L(1)$_{i,i-2}$", "L(1)$_{i,i+2}$" and "L(1)$_{i,i+4}$".

Additionally, of the switching devices forming the third stage 420, when the ith switching device is marked as "ST(2)i", the link connected from the ith switching device of the third stage 420 to the jth switching device of the fourth stage 430, the last stage of the invention, is marked as "L(2)$_{ij}$", the four links of "ST(2)$_i$" are respectively connected to "ST(3)$_i$", "ST(3)$_{i-4}$", "ST(3)$_{i+4}$" and "ST(3)$_{adj}$" of the third stage 420, and marked as "L(2)$_{i,i}$", "L(2)$_{i,i-4}$", "L(2)$_{i,i+4}$" and "L(2)$_{i,adj}$". Here, the "ST(3)$_{adj}$" is an adjacent switch of the "ST(3)$_i$", and means the switch LSB of which is different in the addresses of the switch. That is, if the first switch of the last stage is marked as "ST(3)$_0$", the "ST(3)$_1$ is an adjacent switch of the "ST(3)$_0$".

The link connection regulation of the non-blocking fault tolerant gamma connection network is as follows.

<REGULATION 1>

| | |
|---|---|
| L(k)$_{i,i}$, L(k)$_{i,i-2}^k$ L(k)$_{i,i+2}^k$ | if k = 0, |
| L(k)$_{i,i}$, L(k)$_{i,i-2}^k$ L(k)$_{i,i+2}^k$, L(k)$_{i,i+2}^{k+1}$ | if 1 ≤ k < n − 1 |
| L(k)$_{i,i}$, L(k)$_{i,i-2}^k$ L(k)$_{i,i+2}^k$, L(k)$_{i,adj\,(i)}$ | if k = n − 1, |
| L(k)$_{i,i}$, L(k)$_{i,adj\,(i)}$ | if k = n |

(Here, n = log2(N), 0 ≤ i ≤ n − 1,
N: the number of input port or output port of the interconnection network,
k: stage number of switches,
L: link,
adj (i) = adjacent switch or node of i).

In the REGULATION 1, if it is the first stage (k=0), each switching device of the first stage is connected to the switching device of the second stage with three links, and each switching device form the second stage to the first to last stage (1≤k≤n−1) is connected with four links.

If it is the last stage (k=n), each switching device is connected to the destination node with two links.

The connecting regulation between the source node and the first stage is the same as the regulation between the last stage and the destination node.

If the routing tag for setting a path in the N×N non-blocking fault tolerant gamma network is T, the T is denoted as in the REGULATION 2-1 below.

| (REGULATION 2-1) | | |
|---|---|---|
| T = t$_n$t$_{n-1}$ ··· t$_0$, | t$_i$ = 1 or 0 | (0≤i≤n) |

The non-blocking fault tolerant gamma network of the invention uses a destination address routing algorithm.

Here, the destination address routing algorithm does not require an additional overhead for generating a routing tag, but uses the address of the destination as the routing tag, and therefore generates the routing tag for a short time.

When the destination node "D" is marked as "d$_n$d$_{n-1}$ ··· d$_0$", the routing tag T is marked as the REGULATION 2-2.

| (REGULATION 2-2) | | |
|---|---|---|
| T=d$_0$d$_{n-1}$ ··· d$_0$, | d$_i$ = 1 or 0 | (0≤i<n) |

In the first stage of the network, as the routing tag T is performed by using the LSB t$_0$, the higher link, lower link, or central link is selected according to the lowest bit value d$_0$ of the address of the actual destination node. As the last stages of the network perform the routing scheming operation using the higher bit t$_{n-1}$ of the routing tag T, the higher link is selected according to the MSB value d$_{n-1}$ of the actual destination node address. However, the last stage of the network uses the MSB t$_n$ of the routing tag, and this value corresponds to the LSB value do of the actual destination node address.

As described above, the invention has the effects described below.

The non-blocking fault tolerant gamma network of the invention solves the blocking characteristic of the conventional multi-stage interconnection network, and thus provides a perfect combinational capability capable of simultaneously setting all paths between a plurality of sources and a plurality of destinations. The invention is a multi-stage interconnection network which can be designed with low costs than the conventional nonblocking crossbar network in case of designing a large scaled system.

The interconnection network of the invention also provides a high reliability as a single fault tolerant interconnection network capable of tolerating a single switching fault or a single link fault in the network.

Many different embodiments of the present invention may be constructed without departing from the spirit and scope of the invention. It should be understood that the present invention is no limited to the specific embodiments described in this specification. To the contrary, the present invention is intended to cover various modifications and equivalent arrangements included within the spirit and scope of the claims.

What is claimed is:

1. A non-blocking fault tolerant gamma network for a multi-processor system comprising:

N dual links respectively connected to N source nodes, and for transmitting data input;

a first stage made up with N 2×3 switching devices for outputting data transmitted from said N dual links;

a second stage made up with n 3×4 switching devices for outputting data output from said first stage;

a third stage to (n−1) stage made up with (n−2)×N 4×4 switching devices for receiving data output from said second stage at said third stage and outputting the data to the (n−1) stage;

an n stage made up with N 4×2 switching devices for receiving data output from said n−1 stage and outputting the data; and N dual links connected to N destination nodes for transmitting data output from said n stage, whereby said links, which connect said N source nodes, switching devices of the interconnection network and N destination nodes, are designed according to the connection formula of the following regulation 1, thus simultaneously set all paths between a plurality of sources and a plurality of destinations, and tolerate a single-switching fault or a single-link fault in said interconnection network;

<REGULATION 1>

| | |
|---|---|
| $L(k)_{i,i},\ L(k)_{i,i-2}^{k}\ L(k)_{i,i+2}^{k}$ | if $k = 0$, |
| $L(k)_{i,i},\ L(k)_{i,i-2}^{k}\ L(k)_{i,i+2}^{k},\ L(k)_{i,i+2}^{k+1}$ | if $1 \leq k < n-1$ |
| $L(k)_{i,i},\ L(k)_{i,i-2}^{k}\ L(k)_{i,i+2}^{k},\ L(k)_{i,adj(i)}$ | if $k = n-1$, |
| $L(k)_{i,i},\ L(k)_{i,adj(i)}$ | if $k = n$ |

(Here, $n = \log 2(N)$, $0 \leq i \leq n-1$,
N: the number of input port or output port of the interconnection network,
k: stage number of switches,
L: link,
adj(i) = adjacent switch or node of i).

2. The network as claimed in claim 1, wherein each switching device of said first stage is connected to each switching device of said second stage by three links; each switching device from said second stage to said n−1 stage is connected by four links; the N stage is connected to said n destination nodes by N dual links; and said first stage is connected to N source nodes by N dual links.

3. The network as claimed in claim 1, further comprising:

N 2×3 switching devices having two input ports and three output ports;

N 3×4 switching devices having three input ports and four output ports;

(n−2)×N 4×4 switching devices having four input ports and four output ports; and N 4×2 switching device having four input ports and two output ports;

wherein said switching devices are divided into even switching devices which respectively transmit data to a central link, central-higher link or central-lower link when each routing tag is "0", and also transmit data to a higher link, or lower link when each routing tage is "1", and odd switching devices which respectively transmit data to a central link, central-higher link or central-lower link when each routing tag is "1", and also transmit data to a higher link, or lower link when each routing tag is "0", whereby each of N switching devices performs a self-routing scheme where the interconnection network sets a path for itself from the source nodes to the destination node with only the address of the destination node, while avoiding a single fault and an inter-collision in the interconnection network.

* * * * *